United States Patent [19]
Mouri et al.

[11] Patent Number: 6,050,359
[45] Date of Patent: Apr. 18, 2000

[54] STEERING SYSTEM FOR VEHICLE

[75] Inventors: Hiroshi Mouri, Yokohama; Hiroyuki Furusho, Kanagawa, both of Japan

[73] Assignee: Nissan Motor Co., Ltd., Kanagawa, Japan

[21] Appl. No.: 09/033,009

[22] Filed: Mar. 2, 1998

[30] Foreign Application Priority Data

Feb. 28, 1997 [JP] Japan .................................. 9-046275

[51] Int. Cl.⁷ .................................................. B62D 7/09
[52] U.S. Cl. ........................................ 180/415; 180/168
[58] Field of Search .................................. 180/167, 168, 180/169, 401, 411, 415

[56] References Cited

U.S. PATENT DOCUMENTS

| | | | |
|---|---|---|---|
| 4,219,093 | 8/1980 | Lang | 180/131 |
| 4,671,376 | 6/1987 | Ito et al. | 180/249 |
| 5,079,706 | 1/1992 | Yamaguchi et al. | 364/424.02 |
| 5,234,070 | 8/1993 | Noah et al. | 180/169 |
| 5,289,893 | 3/1994 | Yamamoto et al. | 180/132 |
| 5,379,220 | 1/1995 | Allen et al. | 364/424.05 |
| 5,485,378 | 1/1996 | Franke et al. | 364/424.05 |
| 5,835,870 | 11/1998 | Kagawa | 701/23 |
| 5,893,430 | 4/1999 | Koike | 180/443 |
| 5,931,250 | 8/1999 | Kagawa et al. | 180/167 |

FOREIGN PATENT DOCUMENTS

| | | | |
|---|---|---|---|
| 0 706 930 A2 | 4/1996 | European Pat. Off. | B62D 5/04 |
| 4-38266 | 2/1992 | Japan . | |
| 1364400 | 8/1974 | United Kingdom | G05D 1/00 |

Primary Examiner—Paul N. Dickson
Assistant Examiner—Daniel Yeagley
Attorney, Agent, or Firm—McDermott, Will & Emery

[57] ABSTRACT

A vehicle steering system includes a first steering mechanism for a manual steering mode and a second steering mechanism for an automatic steering mode. A controller steers the vehicle in accordance with information on driving environment, with the second steering mechanism when the automatic mode is selected with a mode selector. There is further provided a holding device for holding the steering angle of the first steering mechanism when the automatic steering operation of the second steering mechanism is under way. In response to selection of the automatic mode, the controller performs the automatic steering control only when a sensor senses a straightforward neutral position of the first steering mechanism.

20 Claims, 10 Drawing Sheets

FIG.6
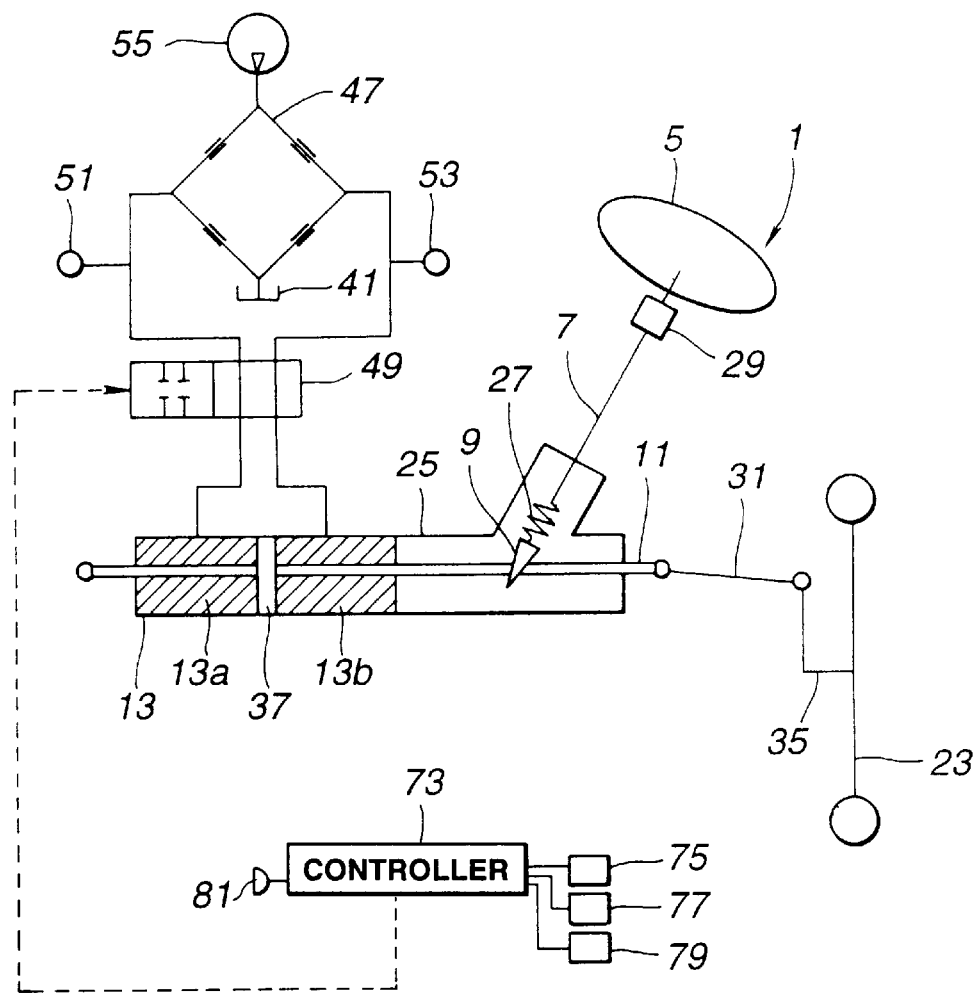
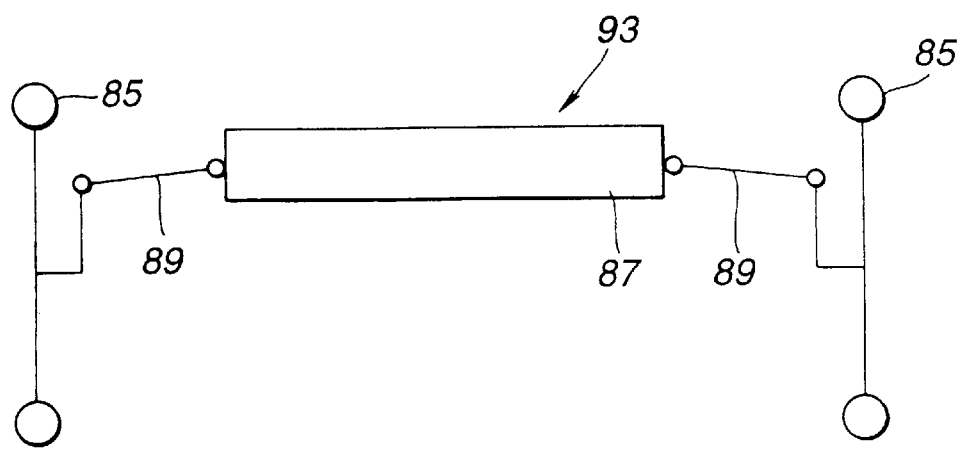

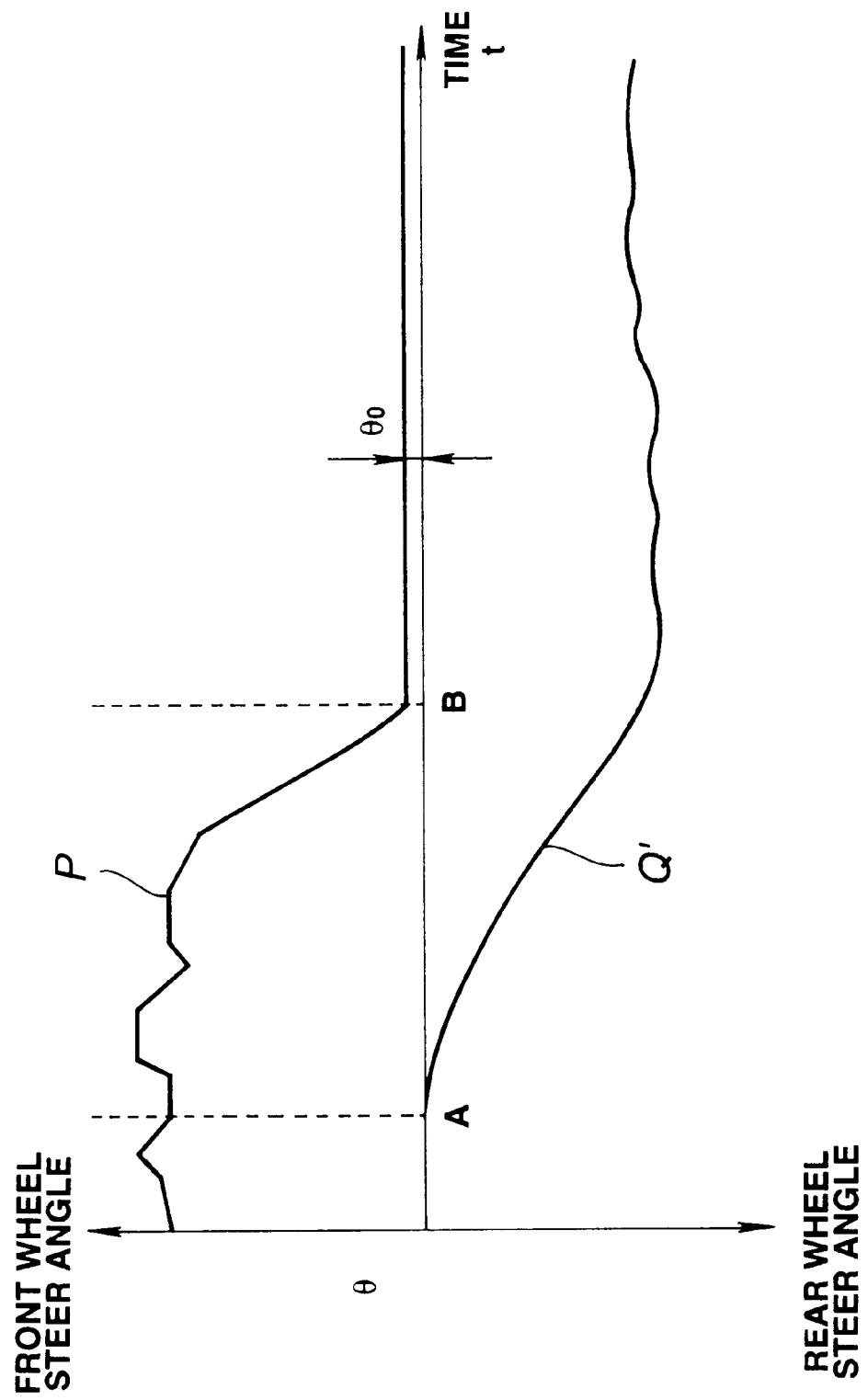

FIG.9
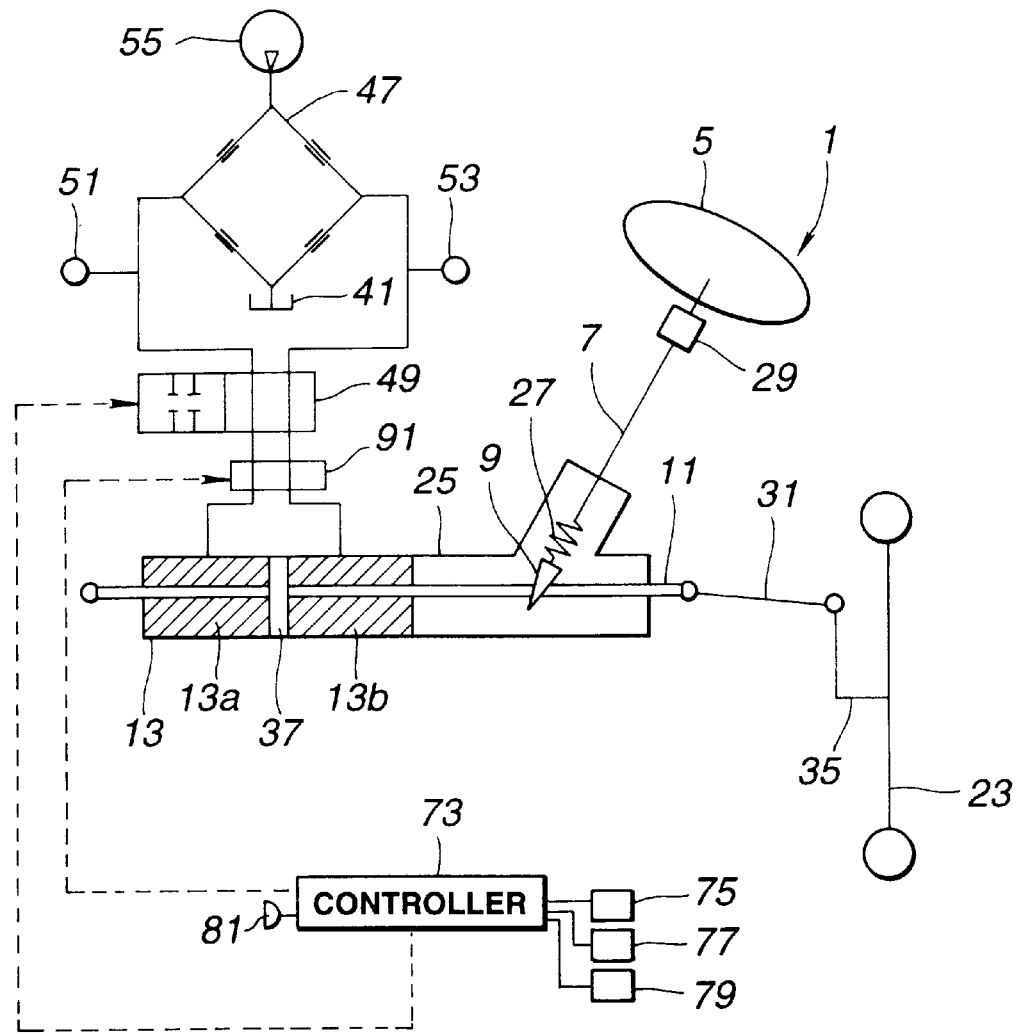
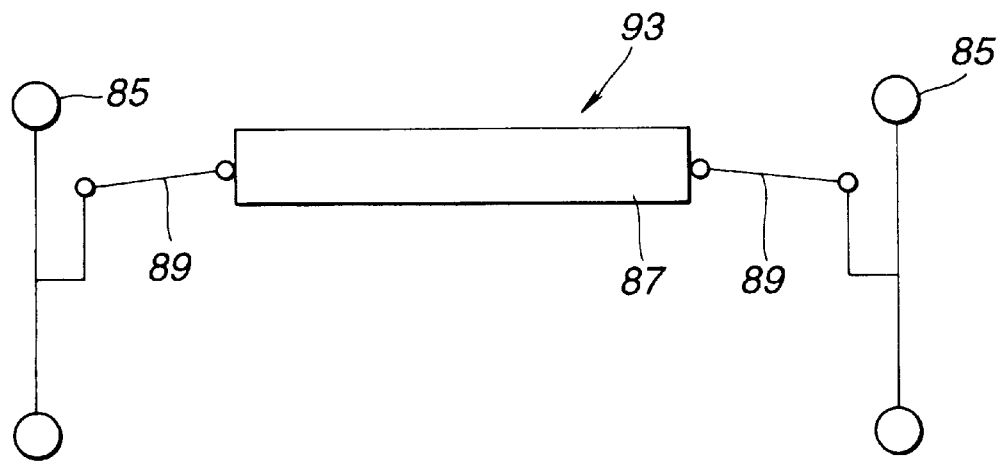

STEERING SYSTEM FOR VEHICLE

The contents of a Japanese Patent Application No. 9-46275 with a filing date of Feb. 28, 1997 in Japan are hereby incorporated by reference.

BACKGROUND OF THE INVENTION

The present invention relates a vehicle steering system having manual steering mode and automatic steering mode.

Japanese Patent Provisional (Kokai) Publication No. 4(1992)-38266 discloses a conventional steering system as shown in FIG. 10.

The vehicle steering system shown in FIG. 10 has first and second steering mechanism 1 and 3. The first mechanism 1 includes a steering wheel 5, a steering shaft 7, a pinion gear 9, a rack shaft 11, a cylinder unit 13 for power assistance and a hydraulic circuit 15. The second steering mechanism 3 includes a servomotor 17 for driving the steering shaft 7 and an automatic steering control unit 19 for controlling the servo motor 17. When the driver turns the steering wheel 5, the first mechanism 1 steers left and right front wheels 21 and 23, and the hydraulic circuits 15 provides power assistance by supplying the working oil to one or the other of pressure chambers 13a and 13b of the cylinder unit 13. On the other hand, by driving the servomotor, the control unit 19 can rotate the steering shaft 7 and steer the front wheels automatically without the intervention of a driver's manual steering operation on the steering wheel 5.

However, this steering system is unable to hold the steering angle of the first steering mechanism 1 during the automatic steering operation of the second steering mechanism 3 because of its structure arranged to rotate the steering shaft 7 in both of the manual mode and the automatic mode. Therefore, this steering system is liable to arouse unnatural feeling when the steering system is changed from the manual mode to the automatic mode. In the automatic mode, the steering wheel 5 is rotated automatically, and this causes uncomfortable feeling to passengers.

SUMMARY OF THE INVENTION

It is therefore an object of the present invention to provide a vehicle steering system which is smooth in changeover between manual steering mode and automatic steering mode and which is advantageous in riding comfort.

According to the present invention, a vehicle steering system for a motor vehicle, comprises:

a first steering mechanism for steering at least one front wheel in accordance with a manual rotation of a steering wheel;

a second steering mechanism for steering one of the front wheel and at least one rear wheel of the vehicle with an actuator independently of the first steering mechanism;

selecting means for allowing a driver to select one of a manual steering mode of the first steering mechanism and an automatic steering mode of the second steering mechanism;

controlling means for performing an automatic control for automatically controlling the actuator of the second steering mechanism in accordance with information on driving environment of the vehicle when the automatic steering mode is selected;

holding means for holding a steering angle of the first steering mechanism while the second steering mechanism is in operation to steer one of the front and rear wheels of the vehicle; and neutral sensing means for sensing a condition of the first steering mechanism to determine whether the first steering mechanism is in a neutral steering position, and to allow the controlling mean to perform the automatic control in the automatic steering mode only when the first steering mechanism is in the neutral position.

This vehicle steering system can hold the first steering mechanism 1 in the straight ahead neutral position during the automatic steering operation in the automatic mode. Therefore, even if the steering system is switched from the manual mode to the automatic mode during a cornering operation, this vehicle steering system can hold the first steering mechanism 1 in the neutral position and continue the automatic steering operation smoothly even after the cornering operation.

BRIEF DESCRIPTION OF THE DRAWINGS

FIG. 6 is a schematic view showing a vehicle steering system according to a second embodiment of the present invention.

FIG. 7 is a graph illustrating a control operation of the vehicle steering system of FIG. 6.

FIG. 9 is a schematic view showing a vehicle steering system according to a third embodiment of the present invention.

DETAILED DESCRIPTION OF THE INVENTION

First Embodiment

Figure 1:
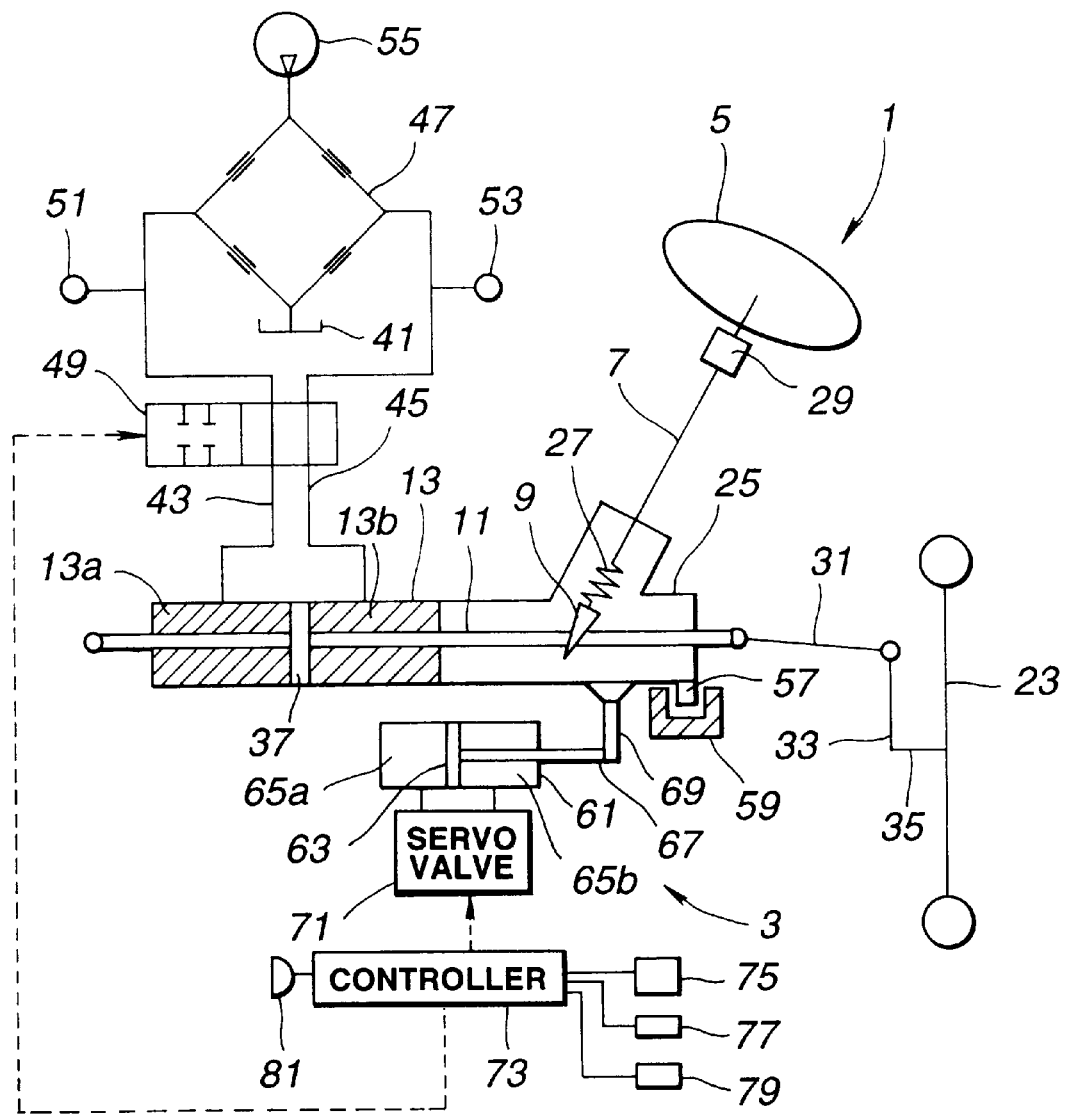
FIG. 1 is a schematic view of a vehicle steering system according to a first embodiment of the present invention.

FIG. 1 shows a vehicle steering system according to a first embodiment of the present invention. The steering system of FIG. 1 is a system for steering a motor vehicle, and comprises a first steering mechanism 1 and a second steering mechanism 3.

Main components of the first steering mechanism 1 are; a steering wheel 5, a steering shaft 7, a pinion gear 9, a rack shaft member 11 and a rack housing 25. The pinion gear 9 and the rack member 11 are supported in the housing 25. A torsion bar 27 is interposed between the steering shaft 7 and the pinion gear 9.

A steering angle sensor 29 is provided on the steering shaft 7. The steering angle sensor 29 serves as a neutral sensing means for sensing a neutral steering position of the first steering mechanism 1.

Each of the left and right ends of the rack member 11 is connected with a left or right side rod 31. FIG. 1 shows only the right side for simplification. On each of the left and right sides, the side rod 31 is connected through a knuckle arm 33 with an axle 35 supporting a front wheel 23.

The rack housing 25 encloses a piston 37 fixedly mounted on the rack member 11 and defines left and right oil pressure chambers 13a and 13b of a power cylinder unit 13 on the left and right sides of the piston 37. The left and right pressure chambers 13a and 13b are connected with an oil tank 41 by left and right pipe arrangements 43 and 45 through a power steering valve 47 provided between the left and right pipe arrangements 43 and 45, and a lock valve 49. The left and right pipe arrangements 43 and 45 have oil pressure sensors 51 and 53 for sensing the respective oil pressures. The lock valve 49 is a normally open type valve designed to prevent the steering wheel 5 from being locked in case of breakage in a signal line or power supply line. A power steering pump 55 is arranged to supply the oil from the tank 41 to the pressure chambers 13a and 13b.

With this construction, the first steering mechanism 1 is a power steering mechanism. In this example, the lock valve 49, the left and right pressure chambers 13a and 13b of the cylinder unit 13 and the pump 55 constitute a means or section for holding a steering angle of the first steering mechanism 1.

The rack housing 25 is formed with a projection 57 which is received in a stroke limiting member 59. The stroke limiting member 59 is fixed to the vehicle body, and serves as a limiting means.

The second steering mechanism 3 comprises a steering actuator 61 which in this example is a hydraulic actuator. The actuator 61 has a steering piston 63 separating left and right steering oil pressure chambers 65a and 65b. The steering piston 63 is connected through a connecting rod 67 with a stay 69 fixed to the rack housing 25.

The left and right pressure chambers 65a and 65b of the steering actuator 61 are connected with the oil tank 41 through a servovalve 71. It is possible to replace the servovalve 71 with an electric motor driver.

A controller section controls the servovalve 71 and the lock valve 49 in accordance with information collected by an input section. The controller section of this example includes a controller 73 connected with the input section. The input section comprises a sensor section which, in this example, includes a vehicle speed sensor 77 and an image sensor (CCD camera) 79 in addition to the steering angle sensor 29. The controller 73 receives information from these devices. The controller 73 sends an output signal to an output device which is a speaker 81 in this example.

The input section further comprises a mode selector switch 75 serving as a selecting means for switching between a manual steering mode of the first steering mechanism 1 and an automatic steering mode of the second steering mechanism 3. With the mode selector switch 75, the driver can switch the steering system between the manual mode and the automatic mode. The mode selector switch 75 has a manual select state for selecting the manual steering mode and an automatic select state for the automatic steering mode.

The image sensor 79 forms images of a forward scene ahead of the vehicle, and the controller 73 receives information on driving environment of the vehicle from the image sensor 79. For example, the controller 73 determines a lateral deviation or a lateral position of the vehicle at a predetermined forward aiming point from the vehicle speed and the position of a white line painted on a road to mark a boundary of a lane. For example, the controller 73 can determine the lateral position of the vehicle relative to a lane from a horizontal distance between the position of a white line in a forward image taken by the camera and the center of the image along a predetermined horizontal line. The controller 73 delivers an output signal to the speaker 81, and a lock (or hold) command signal to the lock valve 49.

This steering system is operated as follows:

If the driver rotates the steering wheel 5 by hand when the mode selector switch 75 is the manual select state, the steering shaft 7 rotates with the steering wheel 5. The rotation is transmitted through the torsion bar 27 to the pinion gear 9. The rack and pinion mechanism of the pinion gear 9 and the rack member 11 converts the rotation to a translational motion of the rack shaft 11 along the right and left direction. The side rods 31, knuckle arms 33 and axles 35 convert the translational motion of the rack member 11 to a rotation again, and steer the left and right front wheels. (FIG. 1 shows only the right front wheel 23.) During this, the torsion bar 27 is twisted by a self aligning torque produced by the left and right front wheels and a steering torque inputted by the driver to the steering wheel 5, and the power steering valve 47 produces the oil pressure in accordance with the angle of twist of the torsion bar 27. By supply and drain of this oil pressure to and from the pressure chambers 13a and 13b, the power steering valve 47 causes a pressure difference to develop between the left and right chambers 13a and 13b, and the piston 37 produces an assisting force by receiving the pressure difference. The driver can steer the front wheels with less effort.

When the mode select switch 75 is operated to change over from the manual steering mode to the automatic steering mode, the second steering mechanism 3 performs the automatic steering operation. In the automatic steering mode, the controller 73 delivers the steering control signal to the servo valve 71 and the lock (hold) command signal to the lock valve 49. In response to the lock command signal, the lock valve 49 moves rightward in FIG. 1 from an open position shown in FIG. 1 to a closed position. In the closed position, the lock valve 49 confines the operating oil in the pressure chambers 13a and 13b, and thereby holds the steering angle of the first steering mechanism 1 by holding the rack member 11 and the pinion gear 9 stationary relative to the rack housing 25. In this example, therefore, the rack housing 25, the rack member 11, the piston 37, the left and right pressure chambers 13a and 13b, the oil tank 41, the left and right pipe systems 43 and 45 and the lock valve 49 constitute the holding means for holding the steering angle of the first steering mechanism 1. While the lock valve 49 is in the closed position confining the oil, the oil flows from the pump 55 into the power steering valve 47 and returns to the oil tank 41 without increasing the oil pressure.

In this state, the servovalve 71 controls the position of the steering piston 63 by controlling the supply and discharge of the oil to and from the left and right steering pressure chambers 65a and 65b. The steering piston 63 therefore moves the rack housing 25 right and left through the connecting rod 67 and the stay 69. With this movement of the rack housing 25, the rack member 11 held fixed to the housing 25 moves as a unit and steers the left and right front wheels in the automatic manner.

When the mode select switch 75 is turned from the manual select state3 to the automatic select state, the controller 73 reads a sensed steering wheel angle of the steering wheel angle sensor 29, and allows the mode change from the manual mode to the automatic mode only when the steering wheel 5 is in the neutral (straight ahead) position. Thus, the steering system is switched to the automatic steering mode and the controller 73 performs the automatic steering control with the servo valve 71 and the steering actuator 61 in accordance with input information about the driving environment of the vehicle only when the steering angle of the first steering mechanism 1 is within a predetermined neutral range corresponding to the straightforward position of the steering wheel 5 of the first steering mechanism 1. The steering system of this example inhibits the automatic steering mode when the steering wheel 5 is out of the neutral position, for the following reason.

Assuming that the steering actuator 61 can control the front wheel steer angle in a range of ±2°, and the steering gear ratio is 20, the controllable range is ±40° in terms of the steering wheel angle. If the automatic mode were initiated at a steering wheel angle of 20° to the right, then the controllable steering angle range would be from 60° on the right side to 0° on the left side, and the left turn in the automatic mode would be infeasible. Therefore, the initiation of the automatic steering mode at steering angles out of the neutral steering angle range could influence the lane following operation in straight line driving adversely. Such an adverse influence makes a mode changeover difficult during a cornering operation.

The vehicle steering system of this example, however, enables the changeover to the automatic mode even during a cornering operation and answers the expectation of the driver, for example, by allowing the driver to answer a portable telephone during cornering. The vehicle steering system of this example makes the driver feel at ease by notifying the driver of the condition of the steering system from the switching operation of the mode selector 75 to the beginning of the automatic control.

The steering system of this example therefore allows the changeover to the automatic steering mode only when the steering wheel angle is within a predetermined around-zero neutral range. For example, this range is; θ0 =±5°.

If the driver switches the mode selector switch 75 to the automatic select state during driving along a curved road with the steering wheel angle being out of the neutral range, then the controller section of this control system can perform the following control operations.

First, the controller 73 defers the changeover to the automatic steering mode until the driver returns the steering wheel 5 to the neutral position of the neutral steering wheel angle range. The controller 73 waits in a standby state without starting the automatic mode until the steering angle of the first steering mechanism 1 is restored into the neutral range. In this standby state, the controller 73 sends an output signal to the loud speaker 81 and announces, to the driver, a message that a lane following control is not possible.

The controller 73 and the speaker 81 serve as a guide means for promoting return of the steering wheel to the straightforward neutral position or inducing the driver to return the steering wheel to the neutral position. The return promoting guide means of this example notifies the driver that the steering angle of the first steering mechanism 1 is out of the neutral range, and the changeover from the manual mode to the automatic mode is not possible.

Second, the controller 73 increases the auxiliary steering angle of the second steering mechanism 3 gradually to an angle δ0 required to follow a current curved lane without cooperation of the primary steering angle of the first steering mechanism 1. In this example, the steering control system produces the front wheel steer angle δ0 required to run along the course of a curved road with the second steering mechanism 3 alone in the state in which the steering angle of the first angle is held in the neutral range. Under the command of the controller 73, the loud speaker 81 gives forth an audible message, "The system will start the automatic mode soon. Until then, please continue to control the steering wheel.", or a message, "The automatic steering mode is permissible only in the straight ahead position of the steering wheel. Please return the steering wheel gradually to the straight ahead position with caution not to deviate from the lane."

Accordingly, the driver returns the steering wheel 5 to the neutral position so as to prevent the vehicle from deviating from the curved course of the lane. At the time the steering wheel angle is returned into the neutral range, the controller 73 shifts the lock valve 49 to the closed position to confine the oil in the left and right pressure chambers 13a and 13b, and thereby holds the steering angle of the first steering mechanism 1 invariable within the neutral range. Thereafter, the controller 73 can carry out the automatic steering control with the second steering mechanism 3 smoothly without receiving adverse influence from the steering angle of the first steering mechanism 1.

Figure 2:
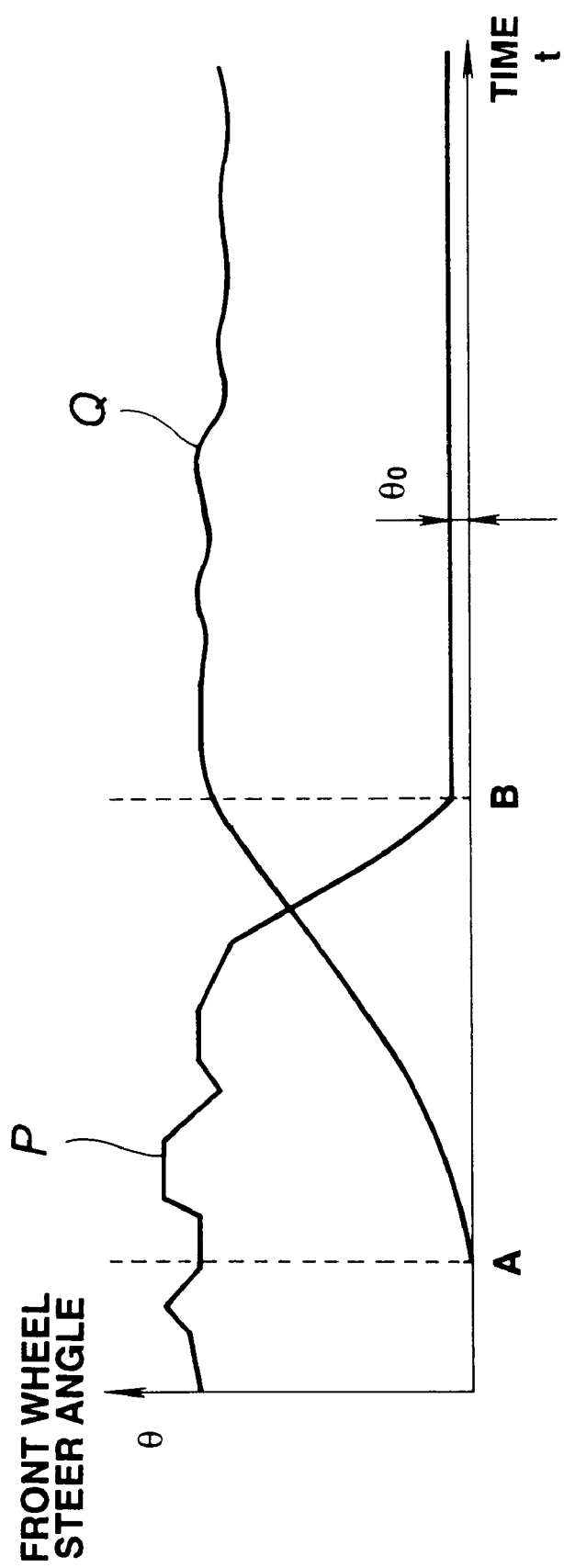
FIG. 2 is a graph illustrating a control operation of the vehicle steering system of FIG. 1.

FIG. 2 illustrates these control operations. The vertical axis of FIG. 2 represents the front wheel steer angle θ, and time t is measured along the horizontal axis. A line P shows variation of the front wheel steer angle due to driver's manual steering operation with the first steering mechanism 1. A line Q shows variation of the front wheel steer angle due to the automatic steering operation of the second steering mechanism 3. In this example, the driver turns the mode selector switch 75 from the manual mode to the automatic mode at a time A while the steering angle of the first steering mechanism 1 is outside the neutral range as shown by the line P. The controller 73 increases the steering angle of the second steering mechanism 3 gradually as shown by the line Q and the driver returns the steering wheel 5 gradually toward the neutral position. At a time B, the steering angle of the first steering mechanism 1 becomes lower than the limit θ0 of the neutral range, and hence the controller 73 holds the steering angle of the first steering mechanism 1 constant, and starts the automatic control of the second steering mechanism 3.

Figure 3:
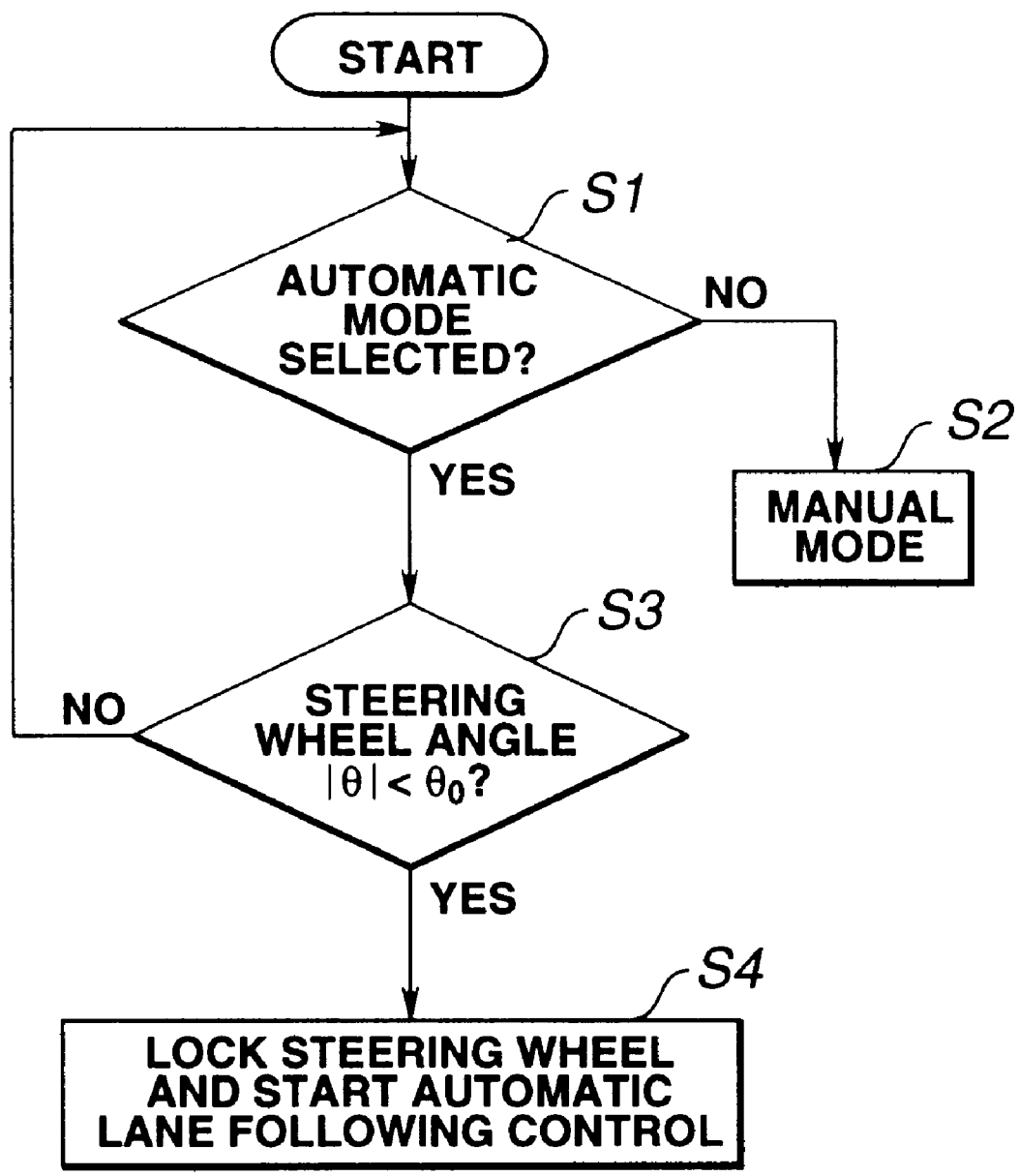
FIG. 3 is a flowchart of a control procedure in a first example according to the first embodiment.

FIG. 3 shows a control process in a first example according to the first embodiment.

At a step S1, the controller 73 examines whether the automatic mode is selected or not, by checking the signal of the mode selector switch 75. When the automatic steering mode is not selected, the controller 73 proceeds to a step S2 and maintains the manual steering mode.

When the automatic steering mode is selected, the controller 73 proceeds to a step S3 and examines at the step S3 whether the absolute value of the steering wheel angle θ sensed by the steering angle sensor 29 is lower than the predetermined limit value θ0. If the absolute value of the steering wheel angle θ is not smaller than the predetermined limit value θ0, that is, the steering angle of the first steering mechanism 1 is outside the neutral range of ±θ0, then the controller 73 returns from the step S3 to the step S1.

If the sensed steering wheel angle θ in the left or right direction is smaller than θ0, that is, the sensed steering wheel angle θ is within the neutral range, then the controller 73 proceeds from the step S3 to a step S4. At the step 54, the controller 73 locks the steering wheel 5 (or holds the steering wheel 5 immovable) and performs the automatic lane following control mode (i.e., the automatic steering mode). Thus, the oil is confined in the pressure chambers 13a and 13b, the steering angle of the first steering mechanism 1 is held constant, and the controller 73 automatically steers the vehicle with the second steering mechanism 3.

The predetermined limit value θ0 of the neutral range is determined in consideration of a control steering angle range and a required front wheel steer angle range. For example, the control system has a control steering angle range of ±Δδc, and the front wheel steer angle range required to drive the vehicle at a vehicle speed limit on a predetermined road (a highway, for example) is ±δn. In this case, the angle θ0 is determined with a margin so that the front wheel steer angle produced at the steering wheel angle of θ0 is smaller than or equal to (δc–δn). When, for example, δc=2 deg, and δn=1 deg, (δc–δn)=1.0 deg. Provided that the steering gear ratio is 20.0, and a control margin in a curvilinear driving operation is 0.7 deg, the setting is; θ0=(2.0-1.0-0.7)*20.0= 6.0 deg.

A similar problem arises when the steering actuator 61 is out of the neutral position at the time of change from the manual mode to the automatic mode. If the steering system is switched to the automatic mode from the operating state in the manual mode with the steering actuator 61 held at a left limit position to steer the front wheels to the left, then the steering actuator 61 in the automatic mode becomes unable to move further in the left steering direction in the automatic mode. Therefore, this steering system is arranged to restore the steering actuator 61 to the neutral position when the system is changed from the automatic mode to the manual mode. At the time of a changeover from the automatic mode to the manual mode, the controller 73 returns the steering actuator 61 to the neutral position in preparation for a next automatic steering operation. In this way, this steering system can perform the switching operation between the manual mode and the automatic mode smoothly without giving unnatural feeling.

In the automatic steering mode, the control section detects a lateral deviation of the vehicle relative to a lane by image processing of forward imagery formed by the camera 79, and automatically steer the vehicle by moving the rack housing 25 right and left with the steering actuator 61 so as to follow the lane faithfully. Instead of the image processing method, it is possible to detect the lateral deviation of the vehicle by using a sensor for sensing magnet members (called magnetic nails) buried in a road, or a sensor for measuring a distance from a roadside wall.

If the driver turns the steering wheel 5 during an operation in the automatic steering mode, the torsion bar 27 is twisted between the steering wheel 5 and the pinion gear 9 locked by the confinement of the oil in the pressure chambers 13a and 13b. Therefore, the power steering valve 47 increases the oil pressure, and the controller 73 monitors the oil pressure produced in the power steering valve 47 with the oil pressure sensors 51 and 53 and shifts the lock valve 49 to the open position to allow a manual steering operation. When the oil pressure produced by the power steering valve 47 and sensed by the sensors 51 and 52 exceeds a predetermined level, the rack housing 25 is fixed, the pressure chambers 13a and 13b are opened, and the steering gear 9 is unlocked to enable the manual steering. Thus, the driver can control the vehicle by turning the steering wheel 5 even in the automatic steering mode operation.

Instead of using the oil pressure sensors 51 and 52, it is possible to employ an oil pressure circuit so arranged to use the oil pressure produced by the power steering valve 47 as a pilot pressure to open the lock valve 49.

Once the lock valve 49 is brought to the open position, the lock valve 49 is not returned to the closed position even if the pressure of the power steering decreases, and the lock valve 49 is held in the open position until the driver selects the automatic steering mode again with the mode selector switch 75. This control system returns the steering actuator 61 to the neutral position as mentioned before when the steering mode is changed from the automatic mode to the manual mode.

When the driver turns the steering wheel 5 in the automatic mode, this steering control system thus terminates the automatic mode, and comes into a state allowing a manual steering operation and next selection of the automatic mode.

The steering control system according to the first embodiment can hold the steering angle of the first steering mechanism 1 during the control operation for steering the front wheels with the second steering mechanism 3, so that the switching between the automatic mode and the manual mode is smooth and comfortable. The steering control system enables the changeover between the automatic steering mode and the manual steering mode during a turning operation along a curved course as well as in a straight line driving operation. The steering control system can respond timely to the need of the driver, and the driver can resort to the automatic steering mode immediately at the time of need. When, for example, a portable telephone rings during a curvilinear vehicle operation, the driver can switch the steering system to the automatic mode and answer the phone.

During the steering operation by the second steering mechanism 3, the steering wheel 5 is held stationary. This is advantageous to the comfort of the driver and passengers. This embodiment utilizes the power steering mechanism as means for holding the steering angle of the first steering mechanism 1. Therefore, the construction is reliable, simple and uncostly.

During the automatic steering operation of the second steering mechanism 3, the stroke limiting member 59 receiving the projection 57 of the rack housing 25 limits the translational movement of the rack housing 25 within a predetermined range. In case of failure in the second steering mechanism 3, this stroke limiting mechanism prevents the vehicle from being steered too much, and ensures a stable vehicle operation.

The stroke limiting member 59 arranged to limit the movement of the rack housing 25 is ineffective in the manual steering operation of the first steering mechanism 1. In the manual mode, the driver can turn the steering wheel 5 without the limitation of the limiting member 59. The limiting mechanism limits the steering angle only in the automatic steering mode.

Figure 4:
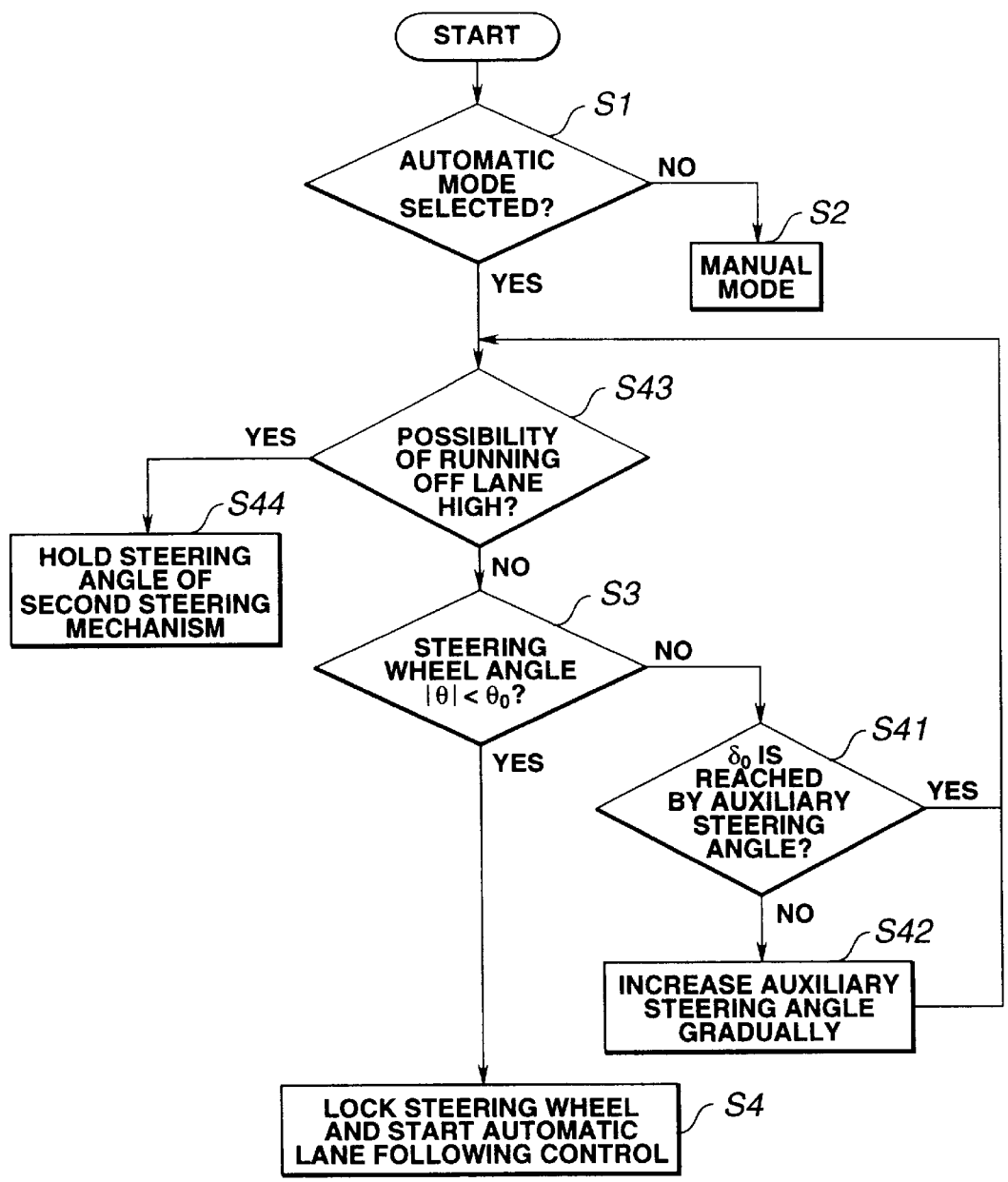
FIG. 4 is a flowchart of a control procedure in a second example according to the first embodiment.

FIG. 4 shows a control process of a second example according to the first embodiment which is performed by the controller 73 shown in FIG. 1. In this example, steps S41 ~ S44 are added to the process of FIG. 3.

At the step S41, the controller 73 examines whether the auxiliary steering angle of the second steering mechanism 3 becomes equal to or greater than a required angle θ0. This angle θ0 is the auxiliary steering angle required to follow a current curved road in the automatic steering mode of the front wheels. If the auxiliary steering angle does not reach the required angle θ0, then the controller 73 proceeds to the step S42, and increases the auxiliary steering angle gradually. Thus, the control system increases the steering angle of the second steering mechanism 3 gradually. After the step S42, the controller 73 proceeds to the step S43, and examines whether the possibility of running off the lane is high or not. This possibility is low if the driver returns the steering wheel 5 to the neutral position during the gradual increase of the auxiliary steering angle of the second steering mechanism 3. If the driver does not return the steering wheel toward the neutral position, the possibility of running off the lane may become high. In such a case, the controller 73 performs an operation to hold the steering angle at the step S44. Thus, the control system terminates the auxiliary steering operation of the second steering mechanism 3 and prevents the vehicle from running off the lane. The example of FIG. 4 can improve the safety.

Figure 5:
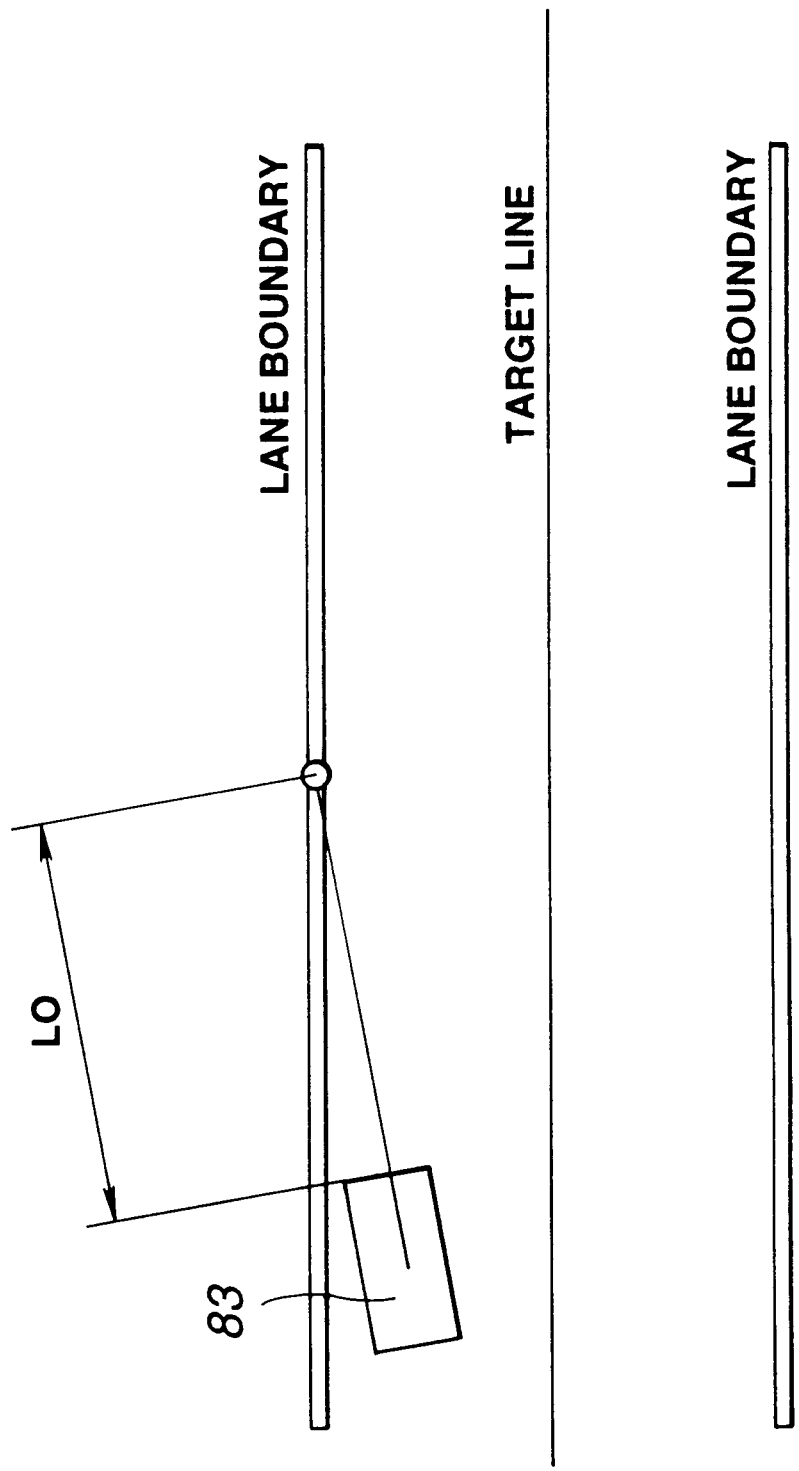
FIG. 5 is a schematic view for illustrating a step S43 of FIG. 4.

In this example, the possibility of running off a lane is estimated in the following manner. While the vehicle 83 as schematically shown in FIG. 5 is running along a lane, the controller section reads road parameters such as a road width and a road configuration determined from the signal from the image sensor 79, the vehicle speed sensed by the vehicle speed sensor 77, and the steering wheel angle sensed by the steering wheel angle sensor 29, moment by moment. The controller section judges the possibility of the vehicle's running off the lane by a distance LO (m) from the vehicle 83 to an intersection (forward aiming point) between an imaginary extension line extended in the forward direction of the vehicle 83 and a lane boundary line (such as a white line). In FIG. 5, the lane the vehicle 83 is currently following is bounded between left and right boundary lines, and the extension line crosses the left lane boundary line. The extension line is a predetermined straight line which may be coincident with or parallel to the optical axis of the image sensor camera of the vehicle or may be coincident with or parallel to the longitudinal axis of the vehicle body. The possibility of the vehicle's running off the lane is dependent on the vehicle speed. Even if the distance LO is the same, this running-off possibility becomes higher as the vehicle speed increases. The controller section can determine the possibility in accordance with the distance LO and the vehicle speed. The running-off possibility increases as the distance decreases, and the possibility increases as the vehicle speed increases.

The required angle θ0 is determined in accordance with information on the driving environment of the vehicle collected by the input section as in the automatic steering mode. In this example, the controller section determines the required angle θ0 by using the signal from the image sensor 79. The controller section can take consideration of the vehicle speed in determining the required angle from images produced by the image sensor 79. To collect the driving environment information, it is possible to utilize magnetic members buried along a road, or mobile data communication between highway infrastructure and in-car equipment.

Second Embodiment

FIG. 6 shows a vehicle steering system according to a second embodiment of the present invention. The vehicle steering system of the second embodiment steers the rear wheels of the vehicle in the automatic steering mode, instead of steering the front wheels as in the first embodiment.

The first steering mechanism 1, the power steering system and the section for holding the steering angle of the first embodiment are substantially identical to those of the steering system shown in FIG. 1.

A second steering mechanism 93 shown in FIG. 6 is arranged to steer the rear wheels 85 of the vehicle. The second steering mechanism 93 comprises a rear wheel steering unit 87 including a power cylinder for the rear wheel steering, and other components. The rear wheel steering unit 87 is connected with the left and right rear wheels 85 by left and right tie rods 89. The controller 73 drives the rear steering power cylinder of the unit 87 by controlling a rear wheel steering control valve and a pump, and thereby controls the rear wheel steer angle of the rear wheels 85.

When the mode selector switch 75 is in the manual select state for the manual steering mode, the driver can steer the front wheels by turning the steering wheel 5 as in the steering system of FIG. 1. If the steering wheel angle is within the predetermined neutral range θ0 when the mode selector switch 75 is turned to the automatic select state, the lock valve 49 confines the oil in the left and right pressure chambers 13a and 13b of the front wheel steering power cylinder 13 to hold the steering wheel angle of the steering wheel 5 invariable, and the second (rear) steering mechanism 93 steers the rear wheels 85 in the automatic mode under the control of the controller 73.

If the steering wheel angle of the steering wheel 5 is outside the neutral range of θ0 when the automatic mode is selected, the control system of this example performs the following control operations.

First, the control system does not start the control of the automatic steering mode until the steering wheel angle enters into the neutral range. Under the command of the controller 73, the loud speaker 81 provides an audible message to notify the driver that the lane keeping control is impossible in a curved roadway.

Second, the control system gradually increases the rear wheel steer angle to the rear wheel steer angle value required to follow the current lane in the state in which the first steering mechanism 1 is in the neutral position. During this, the speaker 81 advises the driver to continue handling the steering wheel for a while until a start of the lane following mode. For example, the message is; "The lane following control will start soon. Please keep controlling the steering wheel for a while."

Accordingly, the driver turns the steering wheel to follow the lane of the curved course, and the first steering mechanism 1 returns toward the neutral position. When the steering angle of the first steering mechanism 1 comes within the neutral range, the lock valve 49 shuts off the pressure chambers 13a and 13b to hold the steering angle of the first steering mechanism 1.

The control system of FIG. 6 varies the front wheel steer angle and the rear wheel steer angle as shown in FIG. 7. A line P shows variation of the front wheel steer angle produced by the first steering mechanism 1. A line Q' shows variation of the rear wheel steer angle due to the automatic steering operation of the second steering mechanism 93. At a time A when the driver turns the mode selector switch 75 from the manual select state to the automatic select state, the controller 73 keeps the lock valve 49 in the open position, and controls the rear wheel steering mechanism 83 to increase the rear wheel steer angle gradually as shown by the line Q'. The driver returns the steering wheel 5 toward the neutral position to keep the vehicle in the lane as shown by the line P. At a time B when the steering angle of the first steering mechanism 1 becomes lower than the limit θ0 of the neutral range, the control system starts the automatic steering control operation with the second steering mechanism 93.

Figure 8A:
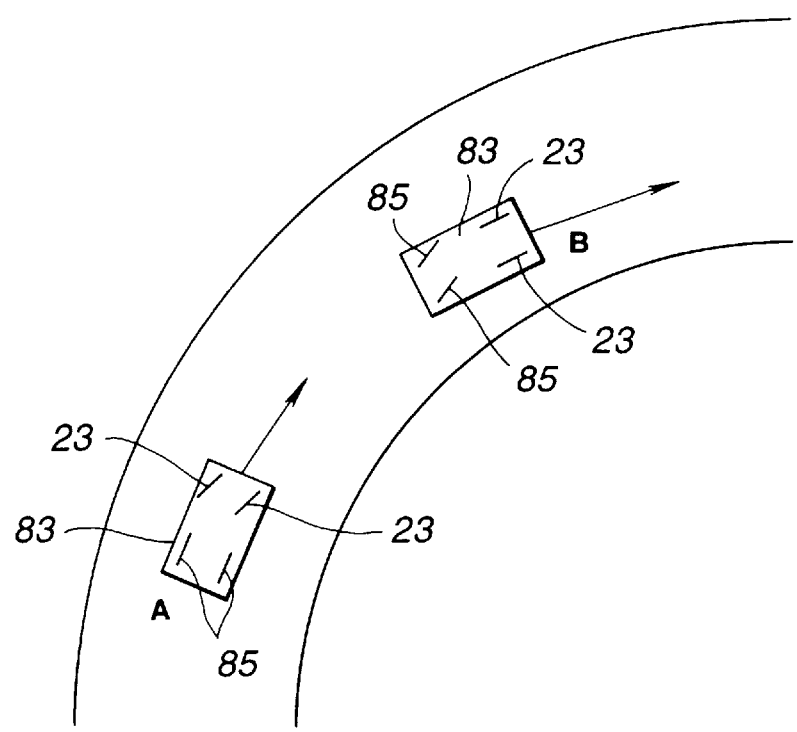
FIG. 8A is a schematic view showing front and rear wheels steered by the vehicle steering system of FIG. 6.
Figure 8B:
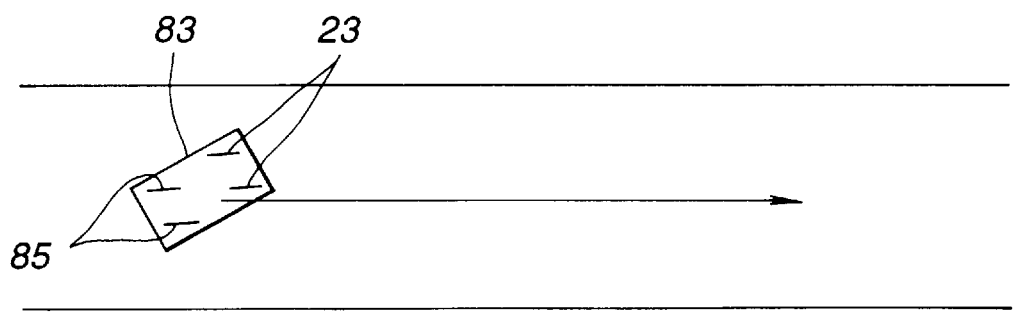
FIG. 8B is a schematic view showing a sideward movement of the vehicle which the steering system of FIG. 6 can avoid.
Figure 10:
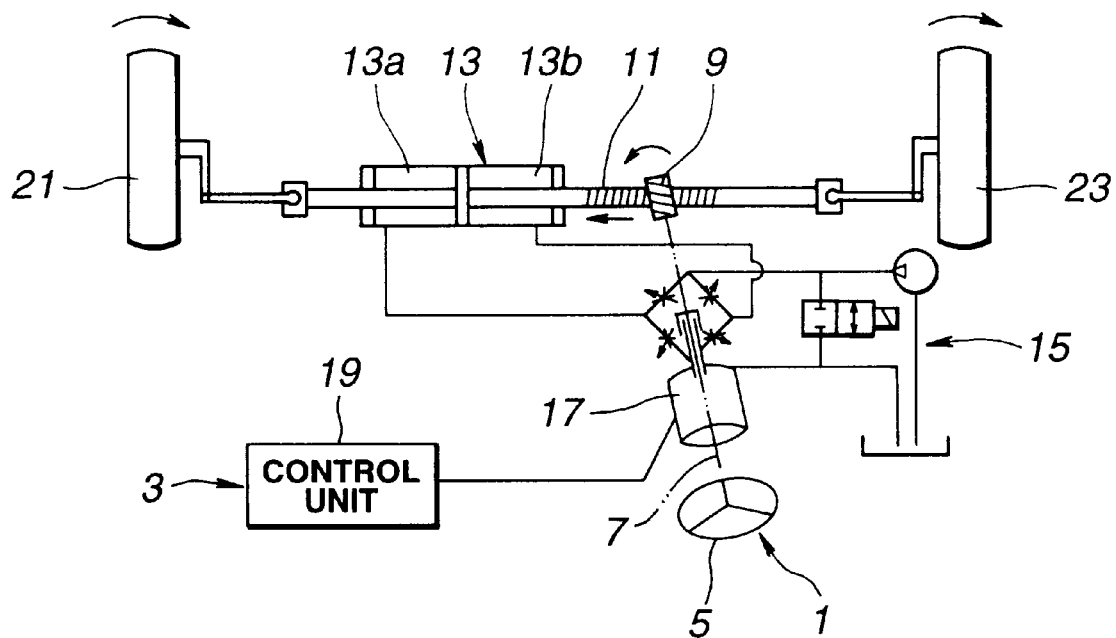
FIG. 10 is a schematic view showing a conventional steering system.

From the time A to the time B, the front wheels 23 and the rear wheels 85 are steered as shown in FIG. 8A. This control system can prevent a sideward movement of the vehicle like a crab as shown in FIG. 8B which would be caused in a straight line course if the steering angle of the first steering mechanism 1 were held by the actuation of the lock valve 49 immediately at the time A.

Preferably, the control system stops the control of the second steering mechanism 93 and holds the rear wheel steer angle at the then-existing value if there is a considerable possibility that the vehicle will deviate from the lane because of handling error of the driver or some other cause (as in the steps S43 and S44). The controller section may be configured to notify the driver of stoppage of the control by an audible message of the speaker 81. When the vehicle enters a straight line road, the control system of this example decreases the steer angle of the rear wheels 85 to its neutral range corresponding to the straightforward position of the rear wheels 85 very gradually (about 0.01 deg/sec, for example).

The second embodiment achieves advantageous effects like the first embodiment. The second embodiment can utilize a known four wheel steering system (4WS). Many parts are shared by the control system of the second embodiment and the 4WS system. The second embodiment is advantageous in layout and design of the system.

Third Embodiment

FIG. 9 shows a vehicle steering system according to a third embodiment of the present invention. The vehicle steering system of the third embodiment is arranged to return the steering wheel 5 to the neutral position by the self aligning torque when the steering wheel 5 is freed. In other respects, the vehicle steering system of FIG. 9 is substantially identical to the vehicle steering system of FIG. 6.

In the vehicle steering system of FIG. 9, a throttle valve unit 91 is added as a damping element to the vehicle steering system of FIG. 6.

When the mode selector switch 75 is turned to the automatic select state, the speaker 81 under the control of the controller 73 sends an audible message to advise the driver to release the steering wheel. For example, the message is "Please lose your hold on the steering wheel." When the steering wheel 5 is released from the hold of the driver, the self aligning torque of the front wheels 23 urges the first steering mechanism 1 to the neutral position. To continue the curved course along the road despite the tendency for the first steering mechanism 1 to return to the neutral position, the controller 73 immediately starts controlling the second steering mechanism 93 in a direction to follow the lane. Then, the controller 73 locks the steering angle of the first steering mechanism 1 when it comes into the neutral range of θ0.

In this way, the vehicle steering system according to the third embodiment can control the steer angles of the front and rear wheels 23 and 85 from the time A to the time B as shown in FIG. 8A, and prevent sideward movement of FIG. 8B.

When the steering mode is changed to the automatic mode, the throttle valve unit 91 works, in response to an output signal of the controller 73, to maintain the stability of the vehicle even after an abrupt loss of the driver's hold on the steering wheel 5. By the action of the throttle valve unit 91, the oil in the left and right pressure chambers 13a and 13b resists against the self aligning torque, and the steering wheel 5 freed from the hold of the driver returns to the straightforward position gradually from the time A to the time B. The vehicle behavior remains stable during the transition from the manual mode to the automatic mode.

The throttle valve unit 91 of this example has a fully open state and a throttle state. When the mode selector switch 75 is turned from the manual select state to the automatic select state, the throttle valve unit 91 is shifted, under the control of the controller 73, from the fully open state to fully open the oil passages leading to the pressure chambers 13a and 13b, to the throttle position for throttling both of the oil passages simultaneously.

The second and third embodiments are similar in operation and effect. By the use of the self aligning torque to return the first steering mechanism 1 to the neutral position, the third embodiment can simplify the construction of the system.

It is possible to employ both of the front auxiliary steering system for automatically steering the front wheels and the rear auxiliary steering system for automatically steering the rear wheels. In one example, the front auxiliary steering system is arranged to absorb the steering angle by the steering wheel 5. If the steering angle of the first steering mechanism 1 is not in the neutral range at the time of the driver's selection for the automatic mode, the lock valve 49 of the holding means immediately holds the then-existing steering angle of the first steering mechanism 1, and the front auxiliary system adds the auxiliary steering angle to hold the front wheels at the straightforward position. While holding the front steer angle in the straightforward neutral range with the front auxiliary steering system (comprising components such as items 61, 71), the control system can perform the control action of the automatic steering mode with the rear auxiliary steering system (comprising components such as item 87).

What is claimed is:

1. A vehicle steering system for a motor vehicle, comprising:

a first steering mechanism—for steering a front wheel in accordance with a manual rotation of a steering wheel;

a second steering mechanism for steering one of the front wheel and a rear wheel of the vehicle with an actuator independently of the first steering mechanism;

selecting means for allowing a driver to select one of a manual steering mode of the first steering mechanism and an automatic steering mode of the second steering mechanism;

controlling means for performing an automatic control for automatically controlling the actuator of the second steering mechanism in accordance with information on driving environment of the vehicle when the automatic steering mode is selected;

holding means for holding a steering angle of the first steering mechanism while the second steering mechanism is in operation to steer one of the front and rear wheels of the vehicle; and neutral sensing means comprising a steering angle sensor for sensing a steering angle of the first steering mechanism to determine whether the first steering mechanism is in or close to a neutral steering position, the controlling mean being allowed to initiate the automatic control in the automatic steering mode only when the first steering mechanism is or close to in the neutral position.

2. A steering system as claimed in claim 1 wherein the holding means holds a steering angle of the first steering mechanism only when the neutral sensing means detects the neutral position of the first steering mechanism.

3. A steering system comprising:

a first steering mechanism—for steering a front wheel in accordance with a manual rotation of a steering wheel;

a second steering mechanism for steering one of the front wheel and a rear wheel of the vehicle with an actuator independently of the first steering mechanism;

selecting means for allowing a driver to select one of a manual steering mode of the first steering mechanism and an automatic steering mode of the second steering mechanism;

controlling means for performing an automatic control for automatically controlling the actuator of the second steering mechanism in accordance with information on driving environment of the vehicle when the automatic steering mode is selected;

holding means for holding a steering angle of the first steering mechanism while the second steering mechanism is in operation to steer one of the front and rear wheels of the vehicle; and neutral sensing means for sensing a condition of the first steering mechanism to determine whether the first steering mechanism is in or close to a neutral steering position, the controlling mean being allowed to perform the automatic control in the automatic steering mode only when the first steering mechanism is in or close to the neutral position, wherein, when the automatic steering mode is selected with the selecting means, the controlling means waits in a standby state and defers the automatic control until detection of the neutral steering position of the first steering mechanism by the neutral sensing means.

4. A steering system comprising:

a first steering mechanism—for steering a front wheel in accordance with a manual rotation of a steering wheel;

a second steering mechanism for steering one of the front wheel and a rear wheel of the vehicle with an actuator independently of the first steering mechanism;

selecting means for allowing a driver to select one of a manual steering mode of the first steering mechanism and an automatic steering mode of the second steering mechanism;

controlling means for performing an automatic control for automatically controlling the actuator of the second steering mechanism in accordance with information on driving environment of the vehicle when the automatic steering mode is selected;

holding means for holding a steering angle of the first steering mechanism while the second steering mechanism is in operation to steer one of the front and rear wheels of the vehicle; and neutral sensing means for sensing a condition of the first steering mechanism to determine whether the first steering mechanism is in or close to a neutral steering position, the controlling mean being allowed to perform the automatic control in the automatic steering mode only when the first steering mechanism is in or close to the neutral position, wherein the steering system further comprises promoting means for promoting return of the first steering mechanism to the neutral position by making the driver aware that the first steering mechanism is not in the neutral position if the first steering mechanism is out of the neutral position when the automatic mode is selected.

5. A steering system as claimed in claim 4 wherein the promoting means comprises means for informing the driver that a changeover from the manual steering mode to the automatic steering mode is not allowed.

6. A steering system as claimed in claim 4 wherein the promoting means includes means for prompting a driver's steering operation to bring the first steering mechanism to the neutral position by turning the steering wheel.

7. A steering system as claimed in claim 6 wherein the promoting means includes means for operating the second steering mechanism.

8. A steering system as claimed in claim 7 wherein the promoting means includes means for producing a required auxiliary steering angle by operating the second steering mechanism, the required auxiliary steering angle being one of a front wheel steer angle and a rear wheel steer angle which is required to follow a road lane in a state in which the first steering mechanism is held in the neutral position.

9. A steering system as claimed in claim 6 wherein the promoting means includes means for instructing the driver to release the steering wheel.

10. A steering system as claimed in claim 9 wherein the first steering mechanism comprises a damping element for providing a damping force to cause the first steering mechanism to return gradually to the neutral position by a self aligning torque when the steering wheel is released under instructions from the promoting means.

11. A control system for a wheeled vehicle, comprising:

a steering system comprising a first steering mechanism for varying a front wheel steer angle in accordance with a driver's steering input to a steering wheel, and a second steering mechanism for varying one of the front wheel steer angle and a rear wheel steer angle of the vehicle in response to a control signal to steer the vehicle, the first steering mechanism comprises the steering wheel, and a steering linkage including a steering gear;

a mode selector for selecting one of a manual steering mode and an automatic steering mode;

a sensor section for collecting information about the vehicle, the sensor section comprising a steering angle sensor for sensing a steering angle of the first steering mechanism being at or close to a neutral straightahead steering angle; and a controller section for automatically steering the vehicle in accordance with the information collected by the sensor section by sending the control signal to the second steering mechanism when the automatic steering mode is selected with the selector;

wherein the sensor section senses a condition of the first steering mechanism and provides data to determine whether the first steering mechanism is in a straightforward neutral steering position, the steering system further comprises a holding subsystem for holding the first steering mechanism when the second steering mechanism is in operation to steer the vehicle, and the controller section automatically steers the vehicle by sending the control signal only when the automatic steering mode is selected and at the same time the first steering mechanism is in the straightforward position.

12. A control system as claimed in claim 11 wherein the holding subsystem comprises an actuating device for holding a steering angle of the first steering mechanism in response to a hold command signal produced by the controller section.

13. A control system as claimed in claim 12 wherein the controller section automatically steers the vehicle by sending the control signal only when a permission signal is present, the controller section produces a neutral condition signal when the first steering mechanism is in the straightforward position, and the controller section sends the hold command signal to the actuating device of the holding subsystem to hold the steering angle of the first steering mechanism and produces the permission signal to permit the automatic steering mode only when the neutral condition signal is present.

14. A control system as claimed in claim 11 wherein the steering linkage of the first steering mechanism comprises a steering shaft, the steering gear comprises a pinion gear, a rack shaft member and a rack housing, and the second steering mechanism comprises a front wheel steering actuator for steering the front wheel, independently of the first steering mechanism, by moving the rack housing.

15. A control system as claimed in claim 11 wherein the second steering mechanism comprises a rear wheel steering actuator for varying the rear wheel steer angle of the vehicle.

16. A control system for a wheeled vehicle, comprising:
a steering system comprising a first steering mechanism for varying a front wheel steer angle in accordance with a driver's steering input to a steering wheel, and a second steering mechanism for varying one of the front wheel steer angle and a rear wheel steer angle of the vehicle in response to a control signal to steer the vehicle;
a mode selector for selecting one of a manual steering mode and an automatic steering mode;
a sensor section for collecting information about the vehicle; and
a controller section for automatically steering the vehicle in accordance with the information collected by the sensor section by sending the control signal to the second steering mechanism when the automatic steering mode is selected with the selector;
wherein the sensor section senses a condition of the first steering mechanism and provides data to determine whether the first steering mechanism is in a straightforward neutral steering position, the steering system further comprises a holding subsystem for holding the first steering mechanism when the second steering mechanism is in operation to steer the vehicle, and the controller section automatically steers the vehicle by sending the control signal only when the automatic steering mode is selected and at the same time the first steering mechanism is in the straightforward position;
actuating device for holding a steering angle of the first steering mechanism in response to a hold command signal produced by the controller section;

wherein the controller section automatically steers the vehicle by sending the control signal only when a permission signal is present, the controller section produces a neutral condition signal when the first steering mechanism is in the straightforward position, and the controller section sends the hold command signal to the actuating device of the holding subsystem to hold the steering angle of the first steering mechanism and produces the permission signal to permit the automatic steering mode only when the neutral condition signal is present; and wherein the controller section is configured to induce s return of the first steering mechanism to the straightforward neutral position when the selector is turned from a manual select state for selecting the manual steering mode to an automatic select state for selecting the automatic steering mode.

17. A control system as claimed in claim 16 wherein the controller section is configured to return the second steering mechanism to a neutral position when the selector is turned from the automatic select state for selecting the automatic steering mode to the manual select state for selecting the manual steering mode.

18. A control system as claimed in claim 17 wherein the control system comprises an output device for producing a warning signal in response to an indication command signal, and the controller section produces the indication command signal when the automatic steering mode is selected but the neutral condition signal is absent.

19. A control system as claimed in claim 18 wherein the warning signal of the output device is one of a visible signal and an audible signal for making a driver of the vehicle aware that the automatic steering mode is not allowed until the first steering mechanism is returned to the straightforward position.

20. A control system as claimed in claim 16 wherein the controller section is configured to increase a steering angle of the second steering mechanism gradually in a direction to necessitate a decrease in the steering angle of the first steering mechanism to maintain an intended radius of turn of the vehicle when the automatic steering mode is selected and the first steering mechanism is out of the straightforward neutral position.

* * * * *